May 31, 1960     A. P. GLATFELTER     2,938,672
ONE SIDED AIR MIST SPRAYER FOR ROW CROPS
Filed April 29, 1959                                                         4 Sheets-Sheet 3
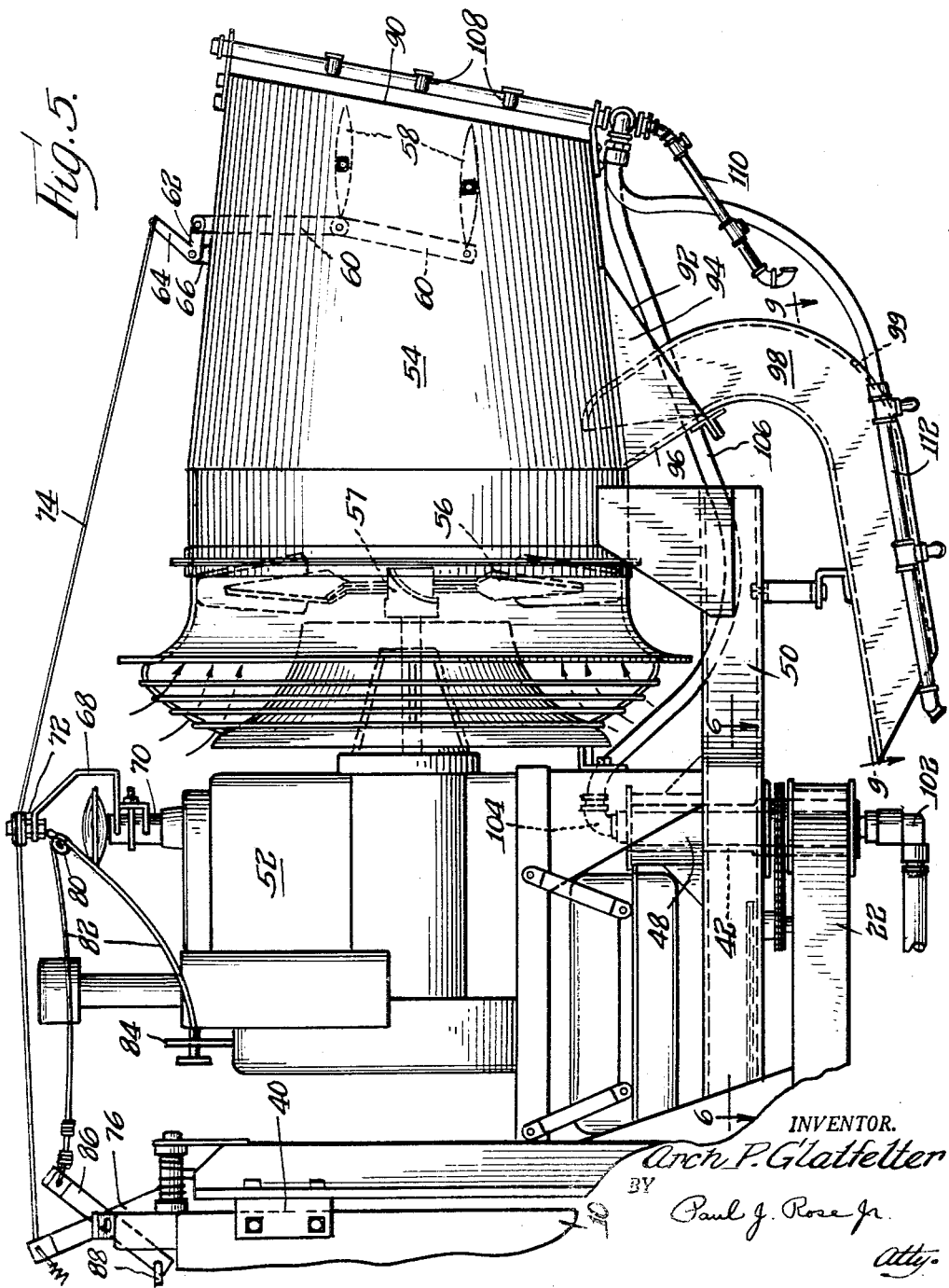
INVENTOR.
Arch P. Glatfelter
BY
Paul J. Rose Jr.
Atty.

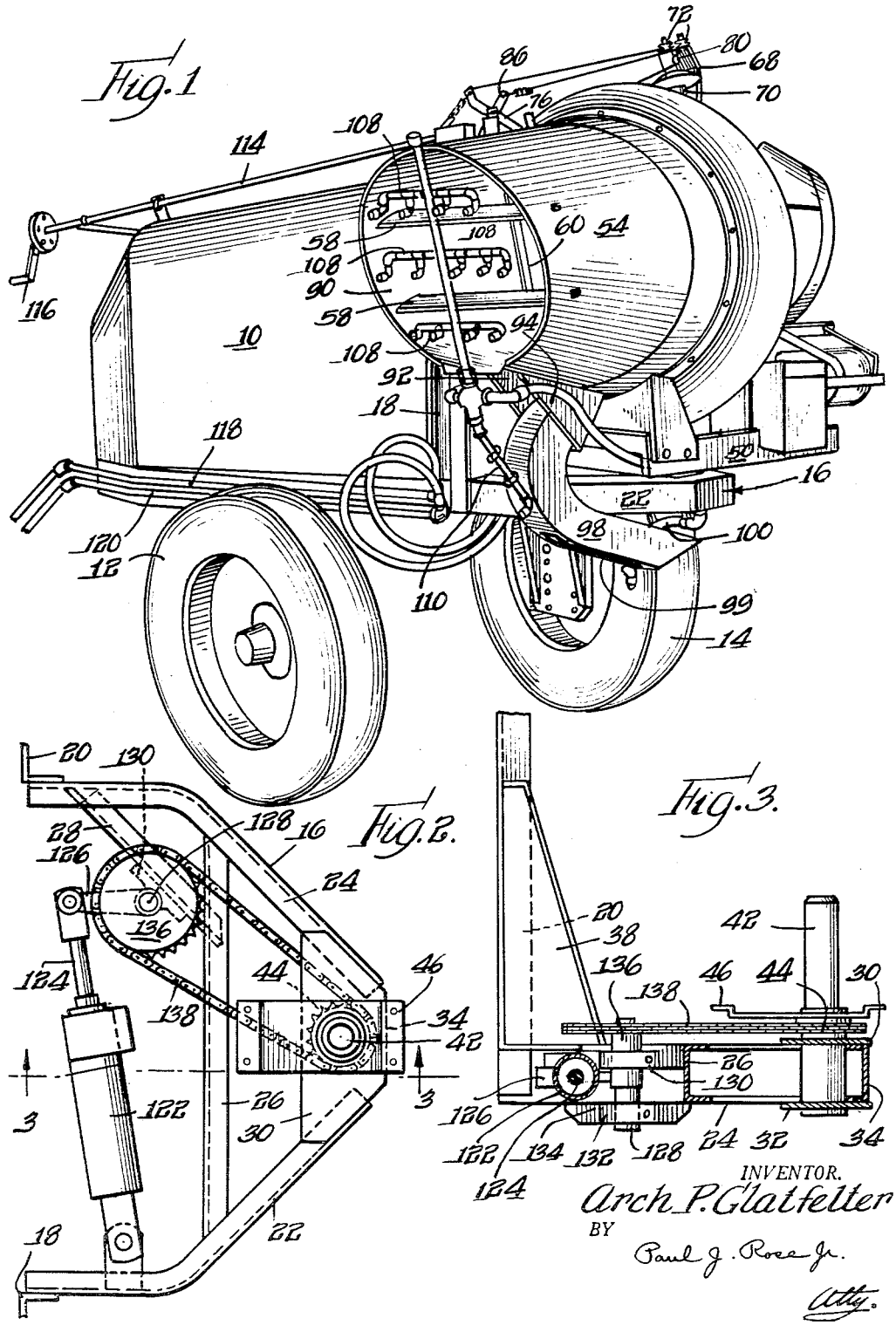

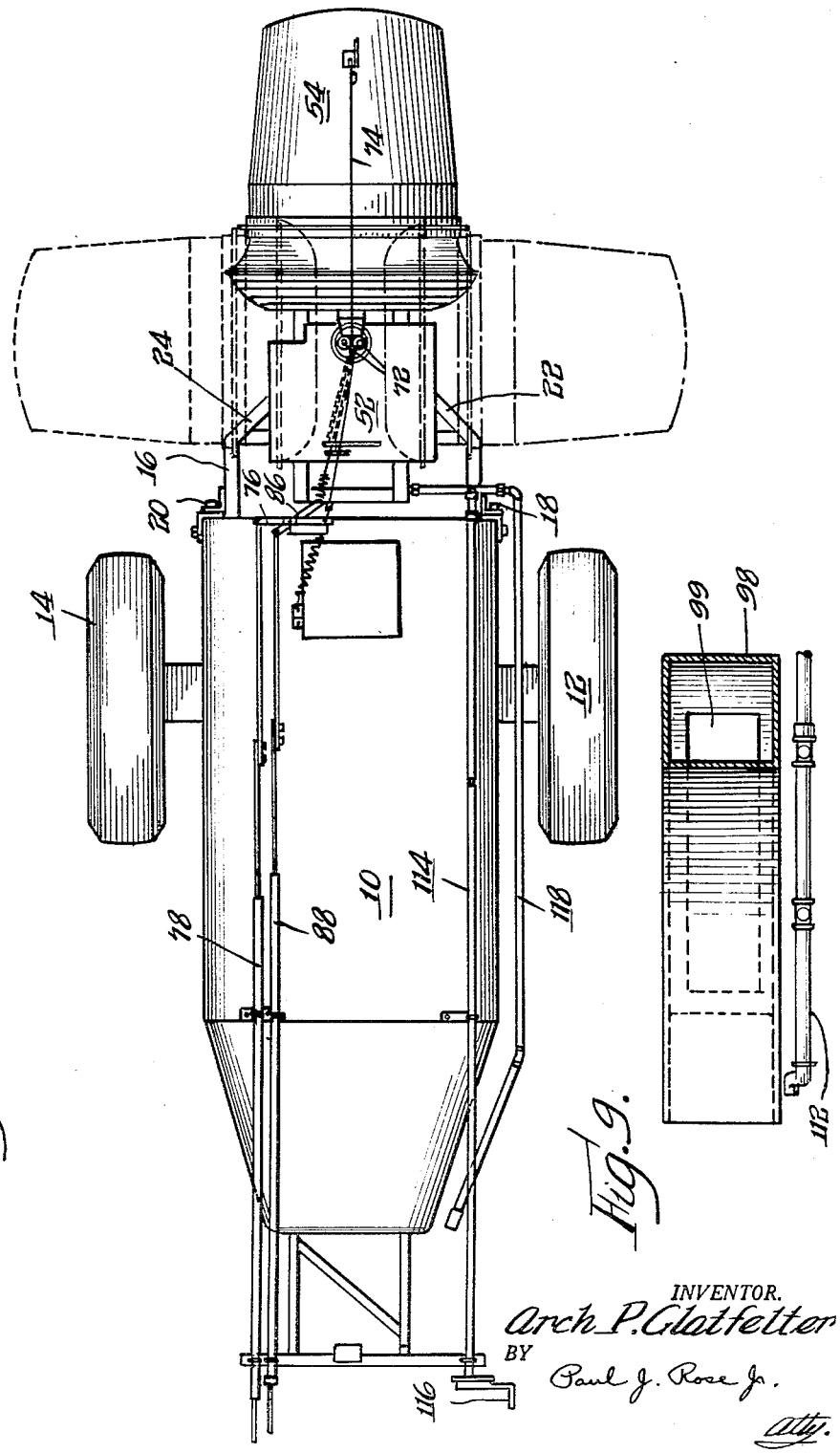

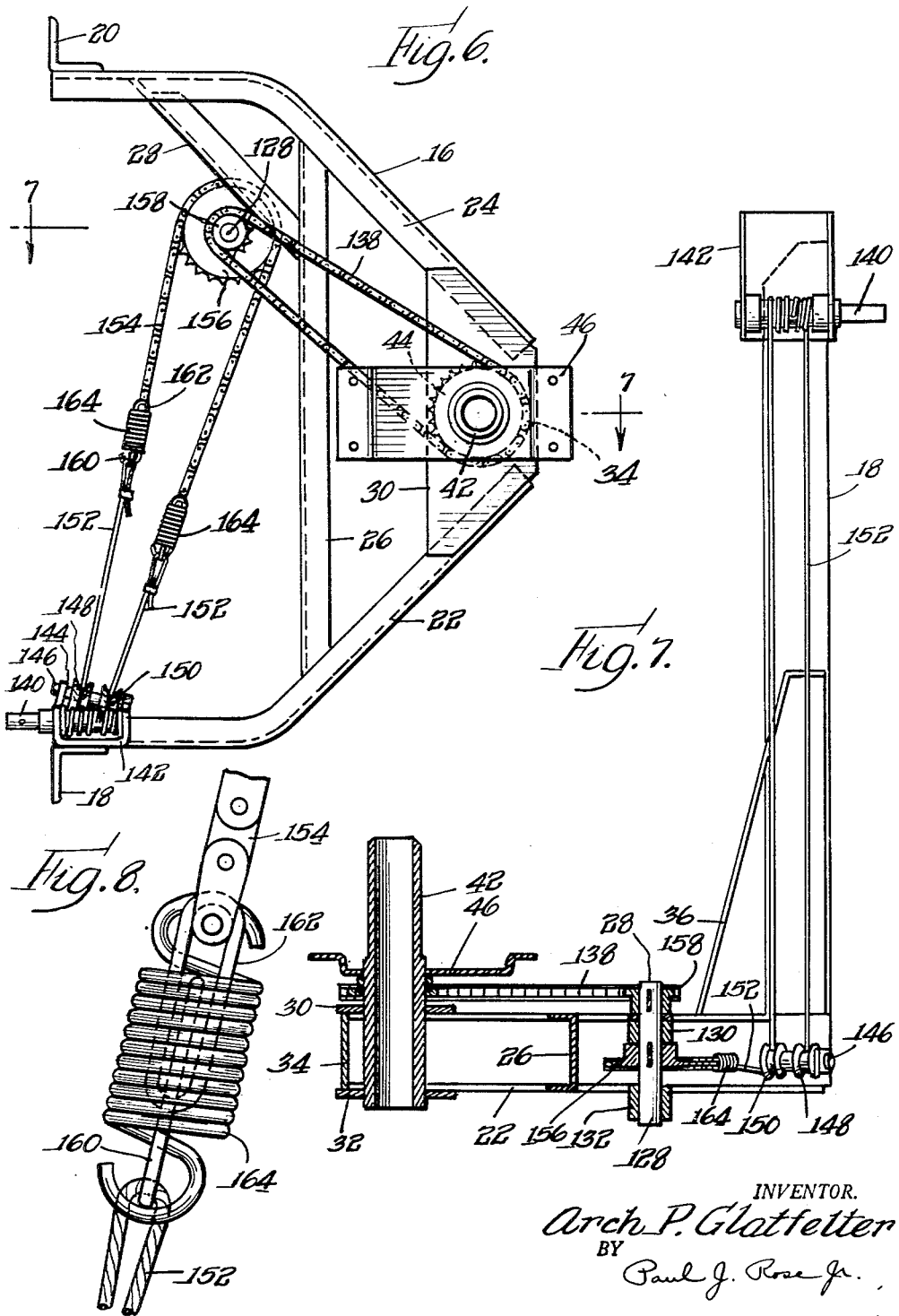

United States Patent Office 2,938,672
Patented May 31, 1960

2,938,672

ONE SIDED AIR MIST SPRAYER FOR ROW CROPS

Arch P. Glatfelter, York, Pa., assignor to The Oliver Corporation, Chicago, Ill., a corporation of Delaware Filed Apr. 29, 1959, Ser. No. 809,667

1 Claim. (Cl. 239—77)

This invention relates generally to sprayers for farm crops, and in particular to one-sided air-mist sprayers for row crops.

An object of the invention is to provide an improved one-sided air-mist sprayer for row crops.

Another object of the invention is to provide a horizontally pivotable spraying unit adaptable to be attached to and supported from the rear of a wheel-mounted tank, wherein a blower fan is mounted concentrically of the output shaft of the driving engine for direct driving thereby.

A further object of the invention is to provide a horizontally pivotable spraying unit adaptable to be attached to and supported from the rear of a wheel-mounted tank and having a main air nozzle for blowing transversely of the direction of travel of said tank and having an auxiliary air duct for blowing downwardly toward crops between said wheels.

These and other objects will appear from time to time as the following specification proceeds and with reference to the accompanying drawings wherein:

Figure 1 is a perspective view of a sprayer constructed in accordance with the invention;

Figure 2 is a plan view of the supporting structure for the spraying unit showing a hydraulic actuator for pivoting the spraying unit into various operating positions with respect to the wheel-mounted tank;

Figure 3 is a sectional view taken in the direction of arrows 3—3 in Figure 2;

Figure 4 is a plan view of the sprayer;

Figure 5 is a side elevational view of the sprayer unit;

Figure 6 is a plan view of the supporting structure for the spraying unit showing a portion of a manually operated means for pivoting the spraying unit into various operating positions;

Figure 7 is a sectional view taken along line 7—7 in Figure 6;

Figure 8 is an enlarged view of one of the spring connections between the operating cable and sprocket chain of Figure 6; and Figure 9 is a view taken along line 9—9 in Figure 5.

In Figures 1 and 4, a tank 10 for containing liquid to be sprayed is shown mounted on a chassis provided with a pair of rubber-tired wheels 12, 14. The tank chassis is provided with means (not shown) for connecting it to the drawbar of a tractor. As will be understood, a universal joint and shaft assembly (not shown) is provided to drive a pump (not shown) from a power take-off shaft of the tractor for spraying liquid from the tank 10.

A main support frame 16 is suitably suspended from the rear of tank 10 by a pair of vertical angle brackets 18, 20. Figures 2 and 6 show frame 16 in plan view. The frame 16 includes a pair of bent channel members 22 and 24, a straight cross channel member 26, an angle brace 28, and an end plate 34, all welded together, and top and bottom plates 30 and 32 bolted to the channel members 22 and 24. The channel members 22 and 24 are welded to angle brackets 18 and 20, respectively, and flanged gusset plates 36 and 38 are welded to the said channel members and angle brackets to provide additional strength. A plurality of brackets, such as bracket 40 in Figure 5, secure the angle brackets 18 and 20 to a flange on the rear of tank 10.

Top and bottom plates 30 and 32 are provided with aligned openings for receiving a hollow trunnion member 42 which is welded to the plates 30 and 32. Pivotally mounted on trunnion 42 is a sprocket 44 having an actuating plate 46 secured to the hub thereof. Also mounted for pivotal movement on trunnion 42 is a swivel bearing housing 48 (Figure 5), which is secured to actuating plate 46 in any suitable manner. The swivel bearing housing 48 encloses suitable thrust and sleeve bearings (not shown) and supports an auxiliary frame 50, which in turn supports a spraying unit including an internal combustion engine 52 and a blower housing 54.

A fan 56 having a hub 57 is mounted on the crankshaft of engine 52 in the blower housing 54. Pivotally mounted in the blower housing 54 are air guide vanes 58 controlled by links 60 and levers 62 and 64, the latter being pivotally mounted on a bracket 66 on top of housing 54. The levers 62 and 64 constitute a bell crank lever.

A bracket 68 clamped to the exhaust pipe 70 of internal combustion engine 52 mounts a pair of pulleys 72 between which is threaded a cable 74 connected at one end to lever 64 and at the other end to an end of a lever 76 pivotally supported from the tank 10. The other end of lever 76 is connected to a control shaft 78 operable from the front of tank 10.

Also suspended from bracket 68 is a pulley 80 which supports a cable 82 connected at one end to an engine throttle control lever 84 and at the other end to an end of a lever 86 pivotally supported from the tank 10. The other end of lever 86 is connected to a control shaft 88 (Figure 4) operable from the front of tank 10.

The blower housing 54 has a main outlet 90 at the end thereof adjacent the vanes 58 (Figures 1 and 5) and has a rectangular opening along the bottom thereof providing a second outlet 92 having triangular plates 94 on opposite sides thereof and a rectangular supporting plate 96 on another side thereof. A curved duct 98 is supported from the plate 96.

A hose 100 (Figure 1) supplies liquid from the tank 10 through a fitting 102, a swivel fitting 104 (Figure 5), and a hose 106 to a plurality of pipes and nozzles, for spraying into the air currents created by the fan 56. Pipes 108 (Figure 1) and the nozzles thereon are for spraying into the air currents from the main outlet 90. Pipe 110 and the nozzles thereon are for spraying into the air current from the outlet 92, it being understood that duct 98 is narrower than the distance between plates 94 so that air can escape therearound. Pipe 112 and the nozzles thereon are for spraying into the air current from duct 98, which is open at both ends and also cut away along a portion of the bottom, as indicated at 99 in Figure 9.

The frame 50, with the engine 52 and blower housing 54 mounted thereon, is pivotable about trunnion 42, as partially indicated by the dotted-line positions of blower housing 54 in Figure 4. Shaft 114 operable by a handle 116 is provided for manually pivoting the frame 50, while hydraulic lines 118 and 120 adaptable to be connected to the hydraulic system of the tractor may be provided for hydraulic operation of the frame 50, it being understood that only one of the two manual and hydraulic operating means is provided on a single spraying unit.

Figures 2 and 3 illustrate hydraulic means for pivoting the frame 50. A cylinder 122 is pivotally mounted on channel member 22, it being understood that hydraulic lines 118 and 120 are connected to opposite ends thereof for controlling movement of a piston therein connected to a piston rod 124 extending from an end of the cylinder. The outer end of piston rod 124 is forked and pivotally connected to an arm 126 keyed to a shaft 128 mounted in a bearing 130 supported on angle member 28 and a bearing 132 supported on an angle member 134 parallel to angle member 28. A sprocket 136 is mounted securely on shaft 128 and a chain 138 is mounted on sprockets 44 and 136 to drive sprocket 44 from sprocket 136 and thus rotate frame 50 and the blower housing 54.

Figures 6, 7, and 8 illustrate manually operable means for pivoting frame 50. A spool 140 operatively connected to shaft 114 is mounted in a bracket 142 secured to vertical angle bracket 18. Vertically below bracket 142 is a bracket 144 secured to angle bracket 18. A pair of pulleys 148 and 150 are mounted on a shaft 146 mounted in the bracket 144. A cable 152 is strung through and wound around spool 140 and has ends running on pulleys 148 and 150, respectively, and connected to the respective ends of a chain 154 mounted on a sprocket 156 on the shaft 128. A sprocket 158 mounted on the shaft 128 operates sprocket 44 on trunnion 42 through the chain 138. Compared to the hydraulic operating means, it will be seen that sprocket 156 has replaced arm 126, and the sprocket 158 has replaced larger sprocket 136 to secure more mechanical advantage.

The connection between cable 152 and chain 154 is shown in Figure 8, both connections being the same. An end of cable 152 is looped through a link 160 linked to another link 162 connected to an end of chain 154. A spring 164 is also connected between the ends of cable 152 and chain 154 to keep the cable under tension.

It will be seen that I have provided an improved sprayer device which is adapted to be readily attached to the rear of a wheel mounted tank, is pivotable on a vertical axis, has the blower fan mounted in alignment with the engine crankshaft, and has auxiliary air outlets and liquid spraying nozzles in addition to the main air outlet and the nozzles in front thereof, for spraying crops adjacent the wheels of the wheel mounted tank.

It will be understood that variations and modifications may be made without departing from the spirit and scope of the invention.

The invention is claimed as follows:

A one-sided horizontally pivotable row crop air-mist spraying unit adaptable to be attached to and supported from the rear of a wheel-mounted tank, comprising a main support frame adapted to be attached to and supported from the rear of a wheel-mounted tank, an auxiliary frame pivotally mounted on said main support frame, an engine including an output shaft mounted on said auxiliary frame, a blower housing mounted on said auxiliary frame, said blower housing having a main outlet at an end thereof spaced from said engine and a second outlet along the bottom thereof spaced from said main outlet, a curved duct mounted in said second outlet and having a downwardly facing outlet, spray nozzles mounted adjacent said main outlet, spray nozzles mounted adjacent said second outlet, and spray nozzles mounted adjacent the outlet from said curved duct for spraying liquid into air currents from said outlets, and a fan mounted in said blower housing and having a hub in alignment with said output shaft.

References Cited in the file of this patent
UNITED STATES PATENTS

| | | |
|---|---|---|
| 2,551,789 | Copley | May 8, 1951 |
| 2,635,920 | Boyce | Apr. 21, 1953 |